United States Patent
Weiser

(10) Patent No.: US 11,454,800 B2
(45) Date of Patent: Sep. 27, 2022

(54) OPTICAL DEVICE AND METHOD FOR HIGH-RESOLUTION IMAGE TRANSFER

(71) Applicant: SCHOTT AG, Mainz (DE)

(72) Inventor: Stefan Weiser, Rosbach (DE)

(73) Assignee: SCHOTT AG, Mainz (DE)

( * ) Notice: Subject to any disclaimer, the term of this patent is extended or adjusted under 35 U.S.C. 154(b) by 1 day.

(21) Appl. No.: 16/893,459

(22) Filed: Jun. 5, 2020

(65) Prior Publication Data
US 2020/0386981 A1 Dec. 10, 2020

(30) Foreign Application Priority Data
Jun. 5, 2019 (DE) .............. 10 2019 115 146.5

(51) Int. Cl.
G02B 23/08 (2006.01)

(52) U.S. Cl.
CPC .................. *G02B 23/08* (2013.01)

(58) Field of Classification Search
CPC ........ G02B 23/08; G02B 23/16; G02B 23/22; G02B 27/0101; G02B 23/02; G02B 2027/012; G02B 23/14; G02B 27/01; G02B 27/1066; G02B 27/143; G02B 27/642; G02B 5/04; G02B 5/30; G02B 7/182; G02B 23/12; G02B 13/22; G02B 2027/0138; G02B 23/00; G02B 23/10; G02B 23/18
See application file for complete search history.

(56) References Cited

U.S. PATENT DOCUMENTS

| | | | |
|---|---|---|---|
| 2,147,615 A * | 2/1939 | Baroni | G02B 23/08 359/211.2 |
| 4,027,945 A | 6/1977 | Iverson | |
| 4,258,976 A | 3/1981 | Scott | |
| 5,721,585 A * | 2/1998 | Keast | H04N 5/23238 348/47 |
| 5,871,266 A * | 2/1999 | Negishi | G02B 19/0028 348/E9.027 |
| 6,283,640 B1 * | 9/2001 | Stephenson | G02B 6/381 385/58 |
| 2005/0036735 A1 | 2/2005 | Oosterhuis | |
| 2005/0158001 A1 * | 7/2005 | Fabian | C08G 18/765 385/128 |

(Continued)

FOREIGN PATENT DOCUMENTS

| | | |
|---|---|---|
| CA | 2049011 | 9/1990 |
| DE | 2740456 | 3/1979 |

(Continued)

*Primary Examiner* — William R Alexander
*Assistant Examiner* — Sharrief I Broome
(74) *Attorney, Agent, or Firm* — Ruggiero McAllister & McMahon LLC

(57) ABSTRACT

An optical device and a method for high-resolution image transfer are provided. The optical device includes an image-guiding element having a distal end and a proximal end, an inverting reflection prism having an entry face and an exit face, and a display element. The image-guiding element directs light beams into the inverting reflection prism, and after having passed therethrough they are directed to the display element, the image-guiding element being mounted for non-stop rotation over more than 360°. The light entry face and the light exit face of the image-guiding element define an angle μ to one another which is between 5° and 175°.

25 Claims, 6 Drawing Sheets

(56) References Cited

U.S. PATENT DOCUMENTS

| | | | |
|---|---|---|---|
| 2009/0279829 A1 | 11/2009 | Popp | |
| 2014/0185138 A1 | 7/2014 | Sklarek | |
| 2015/0362660 A1* | 12/2015 | Wald | G03F 7/70616 |
| | | | 385/38 |
| 2018/0224598 A1* | 8/2018 | Endoh | G02B 6/036 |

FOREIGN PATENT DOCUMENTS

| | | | |
|---|---|---|---|
| DE | 29718058 | 11/1997 | |
| DE | 10323331 | 10/2004 | |
| DE | 102008001653 | 12/2009 | |
| DE | 102006022023 | 7/2011 | |
| DE | 102011100494 | 11/2012 | |
| EP | 1467237 | 10/2004 | |
| EP | 1467237 A1 * | 10/2004 | F41H 5/266 |
| WO | 9011549 | 10/1990 | |

* cited by examiner

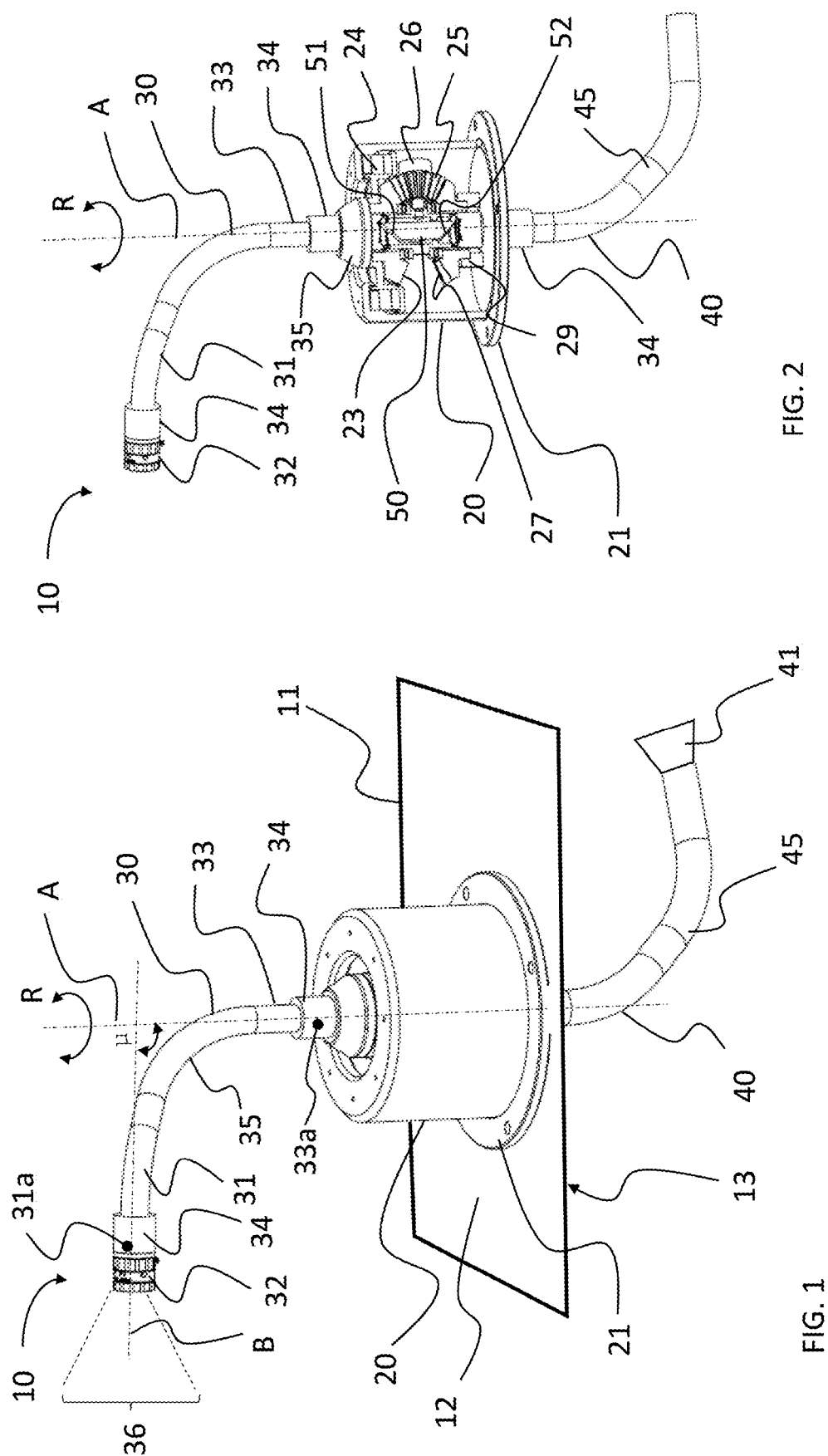

OPTICAL DEVICE AND METHOD FOR HIGH-RESOLUTION IMAGE TRANSFER

CROSS REFERENCE TO RELATED APPLICATIONS

This application claims benefit under 35 USC § 119 of German Application 10 2019 115 146.5 filed Jun. 5, 2019, the entire contents of which are incorporated herein by reference.

BACKGROUND

1. Field of the Invention

The present invention relates to an optical device and to a method for high-resolution image transfer.

2. Description of Related Art

Point-to-point transfer of images, in particular the transfer of a captured image from one location of capture to a second location at a distance therefrom, where the image is visualized, is an important application for many technical fields.

For example endoscopes are known, which enable to examine the interior of organisms. Often, image transfer is achieved using fiber-optic image guides in this case. Such an endoscope is mentioned in document DE 297 18 058 U1, for example. Also, optoelectronic techniques involving a camera are known, for example.

Depending on the specific fields of application for the point-to-point transfer of the image, there are various requirements imposed on the devices for image transfer, which also distinguish them from devices that are designed solely for the transmission of optical signals instead of images. Such optical devices are mentioned in documents DE 10 2006 022 023 B4 or DE 10 2008 001 653 A1, for example.

Document US 2005/0036735 describes a rotary joint for signal transfer between two optical fibers.

Documents U.S. Pat. Nos. 4,027,945 and 4,258,976 describe further devices for signal transfer between a rotating and a stationary component.

In contrast to pure signal transfer, it is known in the field of image transfer to use periscopes in order to be able to observe the surroundings from a protected area or space or the interior of a protected space. In optical devices of this type, the observation is achieved through an elongated tube which has mirrors or prisms mounted at the two openings thereof, which cause light beams travelling perpendicular to the tube to be directed into the tube and to be directed out of the tube with a parallel offset to the initial direction of incidence.

However, such periscopes or angle mirrors have some drawbacks. On the one hand, a rather large opening has to be provided in the protective casing surrounding the protected area, such as an armor, which represents a weakening for the structure as such, but may also be unfavorable for the safety of the person staying in the protected space.

Another drawback lies in the fact that only a horizontally and/or vertically limited view is possible, in particular in the case of angle mirrors, so that rotational monitoring over a range of 360° is not possible. To remedy this, a plurality of angle mirrors may be used arranged at different angles to one another. However, this implies the need to provide even more openings in the protective casing.

Indeed, purely optical rotational monitoring over a range of 360° without stop from a stationary observation place is possible when using an optical tunnel with appropriate deflections, for example using rotatable mirrors. However, the application equipment required for this is very large and heavy. Moreover, devices of this type require a large amount of space, which is very disadvantageous in narrow spaces such as in a particularly protected space in a vehicle. Also, a rather large opening in the protective outer casing may be required here as well, which might imply a weakening.

The use of fiber-optic image guides reduces this possible risk associated with an opening through the protective outer casing, since the size of the required opening can be reduced. Such image guides may be rigid, for example in the form of a rod made of at least one light-guiding element, or flexible, for example in the form of a bundle of light-guiding fibers.

However, the range of possible applications for such fiber-optic image guides is limited by the fact that with a rotational movement for monitoring over a range of 360°, in particular in the case of a continuous all-round monitoring over a range of more than 360° without stop, i.e. over multiple complete rotations about an axis in one direction of rotation, the fiber-optic image guide will be twisted more and more. Further rotation after reaching a maximum physical extent of torsion of the image guide, i.e. further turning or excessive turning beyond this maximum will quickly lead to damage or even destruction of the individual fibers of the image guide and thus render it unusable.

What is therefore desirable is a transfer of images from a rotating objective lens which also allows for all-round monitoring over a range of more than 360°, and which allows to transfer the image to a stationary eyepiece location.

In fact, camera systems for video transfer of images and other optoelectronic applications are known, which allow to transfer images from a rotating objective lens to a display system. However, in particular in specially protected spaces such as armored vehicles, emergency systems are needed and desired, which provide for purely optical all-round monitoring over a range of 360° and more, for example in the event of a failure of the electrical systems, for example caused by an electromagnetic pulse (EMP).

SUMMARY

It would therefore be desirable to have a device and a method for high-resolution image transfer operating on a purely optical and/or mechanical basis, which avoids the drawbacks mentioned above.

Such device should allow for continuous all-round monitoring over a range of 360° and more without stop.

The device should furthermore allow to perform non-stop 360° all-round observation outside or inside a specially protected space on a purely optical and mechanical basis, even in the event of failure or non-usability of electrical systems, for example in the case of failure of a camera with video surveillance or other opto-electronic applications.

It should also be possible to transfer images continuously from a movable objective lens, in particular one that can be rotated without stop about at least one axis of rotation, to a display that is stationary in contrast to the objective lens. Rotation without stop means a rotation about at least one axis of rotation over more than 360°.

At the same time, the required installation space should be as small as possible, so that little space is needed and so that in particular openings through a protective casing can be kept as small as possible. In addition, the weight of the optical device should also be as low as possible.

The inventors have addressed this object.

This object is achieved surprisingly simply by an optical device and a method for image transfer according to the present disclosure.

Accordingly, the subject-matter of the invention according to a first aspect includes an optical device for high-resolution image transfer, preferably through a protective casing.

For this purpose, the optical device may preferably comprise: at least one image-guiding element having a distal end and a proximal end; an inverting reflection prism having an entry face and an exit face; and a display element.

The distal end of the image-guiding element may comprise a light entry face through which electromagnetic radiation in the form of light beams from the surroundings can enter the image-guiding element. The light entry face is preferably coupled to an imaging optical element for capturing light beams, for example from a feature within the field of view of the imaging element, and for generating an image. An image is a virtual optical representation of these light beams. The imaging optical element is preferably an objective lens.

Within the sense of the invention, insofar as light beams are referred to below, that is to say a beam of electromagnetic radiation, this is understood to mean the visible wavelength range of electromagnetic radiation from approximately 380 nm to 780 nm on the one hand. On the other hand, according to the invention this furthermore includes at least the wavelength ranges adjoining on both ends thereof, extending into the near-infrared wavelength range between 780 nm and 3,000 nm, for example, into the infrared wavelength range above 3,000 nm, and into the ultraviolet wavelength range below 380 nm as well. For example, in a preferred embodiment it is contemplated to transmit thermal images in the near-infrared wavelength range using the optical device according to the invention.

The image-guiding element is adapted to guide light beams or electromagnetic radiation from the distal end to the proximal end and to emit and direct them from there to an entry face of the inverting reflection prism which is therefore arranged downstream in the beam path. For this purpose, the proximal end of the image-guiding element may comprise a further optical element for emitting the light beams captured and transmitted by the image-guiding element, for example a lens. This would preferably be a focusing lens that is adapted to project the image onto the entry face of the inverting reflection prism. Accordingly, the image-guiding element and the inverting reflection prism are arranged relative to one another such that light beams can be directed onto the inverting reflection prism after having passed through the image-guiding element. Therefore, the optical axis of the image-guiding element in the vicinity of the proximal end thereof and the optical axis of the inverting reflection prism are preferably arranged parallel or collinear to one another.

An inverting reflection prism, also known as an inversion or reflective prism, typically has two faces which are inclined at the same angle with respect to a base and through which electromagnetic beams can enter and exit. When a beam passes through this entry or exit face during operation of the optical device, the light is refracted and the image is inverted. Generally suitable for the invention are optical elements having an entry face and an exit face, through which a beam can pass, and which cause image inversion by mirror reflection. These can be prisms. An inverting reflection prism particularly suitable for the invention is known as a Dove prism.

When passing through the entry and exit faces of a Dove prism, light beams travelling parallel to the base thereof are refracted twice, with the effect of a single reflection. When such a reflection prism is rotated about an axis of rotation that is preferably identical to the optical axis and consequently lies parallel to the base surface of the inverting reflection prism, a beam passing therethrough will also be rotated about this axis, and the rotation of the beam will be twice as fast as the rotation of the inverting reflection prism. Accordingly, when the image-guiding element rotates at an angular velocity ω about the axis of rotation, the beam will rotate at a rotational speed of 2*ω about the same axis of rotation.

If the Dove prism is rotated at half the speed of the movable part of the image-guiding element, preferably by a special gear assembly, this allows to achieve continuous imaging of the preferably collimated light beams from the input face to the output face in a particularly favorable manner.

Therefore, in a particularly preferred embodiment, the Dove prism is supported such that it can also be rotated relative to the display element. It is contemplated in this case that when the proximal end of the image-guiding element rotates relative to the display element, the inverting reflection prism rotates about the same axis of rotation, but at half the rotational speed.

After the light beams have passed through the inverting reflection prism and have undergone a corresponding mirror reflection, the light beams are advantageously directed, via the exit face of the reflection prism, onto the display element, which is accordingly arranged downstream of the reflection prism in the beam path.

According to the invention it is contemplated in this case that the image-guiding element is arranged and mounted for rotation over more than 360° without stop about an axis of rotation parallel to the optical axis of the inverting reflection prism, relative to the inverting reflection prism and/or to the display element. During operation, this allows to rotate the distal end of the image-guiding element and thus also the field of view of the imaging optical element relative to the display element about this axis of rotation.

In structural terms, for this purpose, the inverting reflection prism and the display element may be accommodated in an enclosing housing, for example, and in this case the proximal end of the image-guiding element can then advantageously be mounted for rotation. The optical axis of the inverting reflection prism preferably defines this axis of rotation about which the proximal end of the image-guiding element is rotatably mounted. This allows the light beams, after emerging from the image-guiding element, to pass through the inverting reflection prism and to enter the display element, thereby avoiding radiation loss as far as possible.

Thus, in operation, the optical device according to the invention for high-resolution image transfer provides for a non-stop all-round observation or all-round monitoring with a corresponding rotation of the image-guiding element in a surprisingly simple manner, by swiveling the light entry face of the image-guiding element, preferably with a rotational movement about the axis of rotation, over 360° and more. The display element is preferably stationary, compared to the rotating image-guiding element.

Insofar as all-round observation is referred to below, this is to be understood as an observation of a space or area in a predetermined field of view, this field of view being limited vertically and/or horizontally by the light entry face or the imaging optical element or the numerical aperture of the image-guiding element. In this context, without stop or non-stop means that the light entry face of the image-guiding element can be rotated over more than 360° about the axis of rotation.

In order to be able to completely observe the surrounding environment with one rotation, at least one deflection of the light beams is needed. Therefore, the surface normal of the light entry face of the image-guiding element and the surface normal of the light exit face of the image-guiding element are preferably at an angle µ to one another. In a preferred embodiment, the image-guiding element may therefore be curved or angled, for example. The surface normal of the light exit face of the image-guiding element is preferably parallel to the optical axis of the inverting reflection prism. In a preferred embodiment, this light exit face and the inverting reflection prism are arranged collinearly to one another in order to allow the light beams from the image-guiding element to optimally enter the entry face of the inverting reflection prism.

The surface normal of the light entry face of the image-guiding element and the surface normal of the light exit face are thus preferably at an angle µ to one another which can be between 5° and 175°, preferably between 20° and 160°, and most preferably between 30° and 150°.

In a very particularly preferred embodiment, this angle is between 85° and 95° and most preferably approximately or exactly 90°, that is to say the field of view that can be imaged is the complete area all around at an almost right angle to the optical axis of the inverting reflection prism so that the viewing direction is deflected by this angle.

According to a preferred embodiment, the image-guiding element is accordingly designed with at least one bend or is angled in order to provide for this deflection of the viewing direction. In order to achieve a design that is as compact as possible, a small bending radius is preferably suggested in the case of a curved design, which bending radius may be less than 50 mm in a preferred embodiment, preferably less than 30 mm, and most preferably less than 20 mm. For an angled embodiment, an angle mirror or a deflection prism may be used, for example, for accordingly deflecting the light beams by reflection.

In an advantageous embodiment of the invention, the angle µ is variably adjustable or selectively adjustable. The optical device can thus very easily be adapted to different installation situations, for example to different vehicles and also to different mounting positions. This allows to define the field of view in a particular orientation, which can therefore also very easily be adapted to different application situations, for example. In a very particularly preferred embodiment of the invention, the angle µ can even be variably adjusted or selectively modified during a rotational movement, that is to say during operation of the optical device, so that an operator of the optical device can change the field of view of the optical device in a further dimension, in addition to the rotation, during operation.

In an advantageous embodiment of the invention, it is accordingly contemplated that the light entry face of the image-guiding element is mounted so as to be movable relative to the light exit face, preferably even during operation of the optical device, most preferably even during a rotational movement of the image-guiding element.

The rotation, that is the rotational movement of the image-guiding element relative to the display element can preferably be achieved without electric power, that is to say purely mechanically, which is particularly advantageous in the event of a failure of electrical systems, for example as a result of a power failure. The all-round observation with a rotation of the image-guiding element over more than 360° without stop therefore surprisingly easily allows for continuous visualization of a view captured on the display element via the light entry face of the image-guiding element and thus allows for all-round monitoring of a space or area, preferably on one side of the protective casing from a preferably stationary location remote therefrom, on the other side of the protective casing.

The optical device according to the invention thus offers the great advantage of permitting to perform an all-round observation without stop outside and/or inside a particularly protected space on a purely optical basis, regardless of the availability of electric power, that is to say with passive optical components.

In the present context, a protected space means a space that is protected or shielded from its surroundings by a protective casing.

Protected space is therefore understood to mean, for example, a stationary or movable space and/or spatial structures which may be equipped with further functional structures, components or extensions, and may be operatively connected thereto, without excluding other embodiments, in particular spaces essentially without windows or essentially without view or with limited viewing options, in particular at least partially or in sections reinforced or armored spaces, that is to say provided with a protective casing, such as towers, reactors, and/or vehicles, for example, in particular armored vehicles, which may be manned or unmanned, remotely controlled or remotely controllable, or at least partially autonomous.

A protected space may thus comprise a movable protected space, for example in or on a vehicle, aircraft or vessel, or else a stationary protected space such as an observation post. A protective casing may serve to provide special protection for an area or a space against impacts or forces acting from the environment, or else to provide protection for an environment from impacts or forces from this space. The side of the protective casing facing the impacting forces will therefore be referred to as the exposed side below, and the opposite side will be referred to as the non-exposed side, i.e. the non-hazardous side.

For the protection, a material or composite or laminated material or layer system, for example, for forming the protective shell can be chosen such that high strength is achieved through the selection of the material on the one hand and by the thickness and arrangement thereof on the other hand. Protection is therefore achieved by the fact that the material, for example an armor, withstands the force to be expected, for example caused by the impact of a projectile, or by another impacting factor, for example excessive heat. In this respect, every opening in the protective casing means a weakening of the strength and stability of this casing and has therefore to be considered as a potential risk for failure of the protective function.

Materials eligible for the protective casing include metals, ceramic materials, or Kevlar, or a combination thereof. Typically, such protective casings or armors do not allow to see therethrough, or only to a limited extent, so that a person who is suitably protected by the protective casing has no possibility of observing what is happening on the other side of the protective casing.

According to the invention, it is therefore contemplated that the optical device, preferably the image-guiding element and/or the display element, comprises at least one portion having a cross-sectional area that is dimensioned as small as possible. As to the image-guiding element, this portion is preferably between the distal and proximal ends.

This offers the great advantage of allowing this portion of the image-guiding element or of the display element to be extended through a protective casing without the need to provide an opening of large dimension for this purpose, which could imply a weakening of this protective casing.

In a very advantageous embodiment, the image-guiding element and/or the display element therefore comprises at least one portion of preferably smaller cross section, in which the cross-sectional area is reduced in order to allow to keep the required opening in the protective casing as small as possible. Preferably, the cross-sectional area is less than 500 mm$^2$, more preferably less than 400 mm$^2$, and most preferably less than 300 mm$^2$. In a particularly preferred embodiment, the cross-sectional area is less than 200 mm$^2$ and even less than 150 mm$^2$, less than 100 mm$^2$, or less than 50 mm$^2$. This allows the opening that has to be introduced into the protective shell to be dimensioned appropriately small. Such a minimization of the required opening translates into an enormous risk minimization for the casing. As far as a portion of smaller cross section is mentioned, this naturally does not rule out the possibility that the image-guiding element or the display element has such a small cross-sectional area over the entire length thereof.

Since such a protective casing generally has a certain thickness, it is furthermore very advantageous if this portion of smaller cross-section of the image-guiding element or of the display element exhibiting such small cross-sectional area has a certain length, i.e. a certain extent in the longitudinal direction so that it can be extended through rather thick materials or laminated materials of which an armor may be made from.

It is therefore very advantageous if the length of this portion of the image-guiding element is matched with the width or thickness of the protective casing through which it is to be extended at the intended location. The length may therefore preferably be at least 5 mm, preferably at least 10 mm, and most preferably at least 20 mm, 100 mm, or even 200 mm. In order to allow for being extended through an opening in a protective casing, it is moreover favorable to keep the outer dimensions of the cross-sectional area consistent along this portion. This makes it possible to use the optical device even in the case of or in combination with a respective rather thick armor of up to 200 mm in thickness or even more.

The optical device according to the invention thus offers the great advantage of allowing to be used on or in conjunction with a protective casing, enabling an operator or user of the optical device to perform an all-round observation of the exposed side of the protective casing on the opposite, non-exposed, protected side of the protective casing using the stationary display element. In this way, the operator is protected by the protective casing from possible hazards or impacting mechanical forces, while being still able to comprehensively observe the opposite space or area on a purely optical basis. Therefore, it is contemplated for at least the display element, but advantageously also for the inverting reflection prism as essential components of the optical device to be arranged on the protected side of the protective casing.

For attachment on or to the protective casing, the display element and/or the inverting reflection prism may be firmly connected to the protective casing.

The image-guiding element and/or the display element may be rigid or flexible, at least in sections thereof. In other words, the image-guiding element may be rigid or flexible as a whole, or may else comprise a combination of a rigid portion and a flexible portion.

A rigid design makes it possible to provide the image-guiding element and/or the display element with a certain degree of inherent stability, so that, for example, additional components or housings for supporting purposes can be dispensed with at least partially. On the other hand, a flexible design or at least section-wise flexible design allows for a correspondingly variable and versatile routing of the image-guiding element and/or the display element. An at least section-wise flexible design in particular easily permits the angle $\mu$ to be adjusted in an appropriately selective manner or to be changed during operation in order to change the field of view.

However, it is also possible for the curved or angled portion of the image-guiding element and/or of the display element to be rigid in order to provide a certain degree of inherent stability in this area. For example, the image-guiding element may have a flexible portion adjoining towards the distal end, which allows the image-guiding element to be routed particularly flexibly.

In a particularly preferred embodiment, the image-guiding element and/or the display element comprises at least one high-resolution fiber-optic image guide for image transfer. The high-resolution fiber-optic image guide may be of both flexible and rigid design.

During operation of the optical device, the high-resolution fiber-optic image guide allows to capture light beams from the light exit face of the inverting reflection prism and to convey them to a spaced-apart location where visualization for an operator can be achieved, for example via an eyepiece.

Fiber-optic image guides consist of a multitude of optical fibers or light-guiding fibers which are kept in the same order on the input and output sides, and each fiber is able to transmit brightness and color information. The light can be transmitted through reflection at the interface between cladding and core within an optical fiber. In order to avoid light from passing between adjacent optical fibers, the latter are advantageously appropriately protected. The number and size of the optical fibers determine the optical resolution of the image and hence the quality of the image transfer of the optical device.

A high-resolution fiber-optic image guide is able to meet the requirements for a small cross-sectional area on the one hand and at the same time for high resolution on the other hand. The diameter of an optical fiber determines the resolution of the transmitted image, and smaller diameters provide for a higher resolution.

A preferred choice for the invention are high-resolution fiber-optic image guides comprising individual optical fibers of small diameter, preferably with a diameter of the optical fiber of 12 µm or less, preferably 10 µm or less, most preferably 7 µm or less.

These individual optical fibers can be combined to form a rigid light-guiding element or rigid image guide, or to form a flexible bundle comprising a large number of such optical fibers. Such a light-guiding element or bundle may advantageously comprise at least 1,000, preferably at least 5,000, most preferably at least 10,000 optical fibers. For a high-resolution fiber-optic image guide, also known as a "wound fiber bundle", a large number of such bundles can then in turn be combined, so that a high-resolution fiber-optic image guide that is very suitable for the invention then comprises a multitude of at least 10,000 optical fibers, preferably at least 100,000, and most preferably at least 200,000 optical fibers, or even more.

A fiber-optic image guide suitable for the invention and comprising 160,000 optical fibers, for example, with a diameter of the individual optical fiber of 10 µm, for example, is thus capable of providing a resolution in a range of approximately 45 lp/mm (line pairs per mm), while a resolution of at least 25 lp/mm, preferably at least 30 lp/mm, most preferably at least 40 lp/mm may already be sufficient for use according to the invention. Such a high-resolution fiber-optic image guide is particularly well suited for the optical device and offers excellent sighting options, even in the long range of 500 m and more.

The cross-sectional area of the fiber-optic image guide, at least of the portion with a smaller cross section thereof, determines the size of the required opening that has to be provided in the protective casing in order to be able to extend the image-guiding element therethrough, while an optional sheathing of the fiber-optic image guide must also be taken into account. Very small cross sections of flexible fiber-optic image guides that are suitable for image transfer may be in a range starting from approximately $2*2\ mm^2=4\ mm^2$ or from a diameter of 1 mm and already provide for good daytime observation in the close range of the optical device. This allows to reduce the opening in the protective casing to a cross-sectional area of approximately this dimension. With such a small opening, the weakening of the structure of the protective casing can be regarded as minimal.

As a matter of course, larger cross-sectional areas are also possible and will allow, for example, to provide an appropriate sheathing, however a size of the cross-sectional area of about $40*35\ mm^2=1,400\ mm^2$ should not be exceeded in order to permit to keep the opening in the protective casing as small as possible. The tolerable size of the opening naturally also depends on the type and material of the protective casing itself, so that the choice of a suitable image-guiding element can depend on this on the one hand and on the other hand on the optical requirements, so that larger cross-sectional areas are also conceivable.

In contrast to the flexible fiber-optic image guides, rigid fiber-optic image guides, also known as "clad rods", allow to use optical fibers with a smaller diameter, for example of about 4 µm, which can even provide for good night vision options of the optical device.

Basically, the fiber-optic image guides can be configured and selected in many respects according to the specified requirements with regard to their outer geometry, the number and the size of the individual optical fibers.

Advantageously, the image-guiding element and/or the optical device according to the invention exhibit high temperature resistance and, in a preferred embodiment, comply with the relevant standards, such as MIL-STD-810H (2019), so that they can be employed within the scope of the standard. Accordingly, temperature resistance of the optical device is preferably in a range from at least −20° C. to +100° C., more preferably from −55° C. to +125° C., in order to be eligible for use even under extreme conditions. Many fiber-optic image guides meet these requirements.

The choice of the imaging optical element is advantageously matched with the resolution and configuration of the optical device in terms of its resolution performance. For example, so-called C mount objective lenses are known, i.e. objective lenses with an interface according to the C mount standard, which have a resolution of more than 75 lp/mm or even more than 150 lp/mm and can therefore be used very well with the fiber-optic image guides mentioned above. Other objective lenses may of course also be used and employed, for example common industrial objective lenses or other objective lenses that were developed for special applications.

High-resolution fiber-optic image guides are particularly well suited for image transfer for the optical device according to the invention, since they can be made with a very small cross-sectional area and thus excellently meet the requirement of minimizing the opening in the protective casing.

Furthermore, fiber-optic image guides are feasible and available at a length of more than 1 m, for example 2 m or even more, such as flexible fiber-optic image guides with a length of up to about 5 m, known as "wound fiber bundles" available from Schott A G, Mainz. An implementation in the form of a high-resolution flexible fiber-optic image guide offers the great advantage of allowing for a very flexibly image transfer and of allowing to geometrically adapt the image-guiding element and/or the display element very well to the spatial conditions.

For example, a flexible fiber-optic image guide for the image-guiding element may be laid from the optical device through the protective casing and into a tower and/or to a targeting system and can then be moved together with the tower or the targeting system. For this purpose, it is very advantageous if the image-guiding element comprises the flexible fiber-optic image guide mentioned above, preferably with an appropriate length of, for example, 3 m, or 4 m, or more in this case.

This provides for use for or in conjunction with modern active or passive, or else defensive or offensive observation or operation systems, for example for what is known as a "watch tower container", that is a stationary protected operator's space of an optionally remotely controlled or remotely controllable observation or operation station, also known as a "remote station". Such remotely controlled or remotely controllable or at least partially autonomous observation or operation stations are of course also feasible and implementable in combination with moving vehicles. Such systems are often equipped with an endlessly rotating or rotatable platform, and the optical device according to the invention allows to maintain external sighting capability and operational functionality in a passive way, in the event of a failure of the primary systems.

On the other hand, a rigid implementation has the advantage that no complex additional support structures are required for the image-guiding element. The image-guiding element can thus be made very small and light weight.

In a refinement of the invention, the fiber-optic image guide may comprise further special optical fibers, for example so-called IR fibers. IR fibers in the sense of the invention are designed to transmit electromagnetic radiation in the near infrared or infrared range. This allows the optical device to be used very well in the field of thermal image transfer.

In a preferred embodiment, the fiber-optic image guide may therefore exclusively or additionally comprise IR fibers for transmitting electromagnetic radiation in the near infrared range between 780 nm and 3,000 nm and/or in the infrared range above 3,000 nm.

For such embodiments, the display element is preferably likewise chosen or designed for the transfer and/or visualization of thermal imaging radiation, that is so as to be able to reproduce thermal images.

For a good reproduction of images, in particular also of thermal images, it is helpful if the optical system exhibits a lowest possible attenuation, that is highest possible transmittance of electromagnetic radiation in the relevant wavelength ranges. Therefore, the maximum attenuation of the image-guiding element and/or of the display element in the visible wavelength range of electromagnetic radiation between 380 nm and 780 nm is at most 5 db/m, preferably at most 3 db/m, most preferably at most 1 db/m. If IR fibers are employed, maximum attenuation in the near infrared range between 780 nm and 940 nm is likewise preferably at most 5 db/m, preferably at most 3 db/m, most preferably at most 1 db/m.

This preferably also applies to the wavelength range of up to 3,000 nm and beyond, and/or for the ultraviolet wavelength range below 380 nm.

What can be achieved in this way in an advantageous embodiment is that, for example, the dynamic range or thermal sensitivity, i.e. the smallest detectable temperature difference for a given ambient temperature of a thermal sensor or thermal imaging camera downstream of the display element remains largely exploitable. Characteristic parameters for this are usually the minimum resolvable temperature difference (MRTD) or noise equivalent temperature difference (NETD).

In a likewise preferred embodiment, the image-guiding element comprises additional or complementing optically effective marking elements which enable an operator to identify or read off the specific angle of rotation or increment of rotation of the imaging optical element. In particular when a high-resolution fiber-optic image guide is used, these may be specific optical fibers that may define a mark. Such marking elements may comprise passive and/or active marking elements.

Passive marking elements may comprise voids within the fiber bundle of the image guide, for example, or marked optical fibers such as differently colored optical fibers, for example black colored optical fibers.

Active marking elements may comprise markable optical fibers, for example, such as fibers within the fiber bundle of the image guide that can be lightened and are permanently lightened during operation.

In the cross section of the image-guiding element, these marking elements may be arranged at regular intervals to one another along the outer edge, for example. High-resolution fiber-optic image guides suitable for the invention may have a circular cross-sectional shape. In this case, a division similar to a clock face or a compass rose may be appropriate, for example. The individual circle segments may then each be marked with respective identical marking elements, for example, or else with marking elements of different appearance, for example with marking elements of different size or number, or else with marking elements arranged in the form of digits. The interval between neighboring marking elements may be used as an increment for determining the orientation, i.e. the specific rotational angle by which the proximal end is rotated relative to a zero position. Such marking elements may thus define a kind of compass rose and enable an operator to associate the current viewing direction with the specific angle of rotation of the imaging optical element and thus with the field of view, from a stationary display element. This is very helpful in particular when observing the outside through a rotation of more than 360°, in order to facilitate outside guidance of the operator when looking at the display element.

The marking elements may be arranged particularly simply in the vicinity of the distal or proximal end of the image-guiding element, or else throughout the fiber bundle, i.e. on the objective lens side or on the display side, but also elsewhere within the image-guiding element.

As a matter of course it is also possible, according to a further preferred embodiment of the invention, to combine IR fibers with the marking elements mentioned above, that is to say to use a high-resolution fiber-optic image guide comprising IR fibers for the image-guiding element and additional marking elements.

The display element may comprise a passive optical component, preferably an eyepiece, which allows an observer to perceive the captured image purely optically, with the human eye.

As an alternative or in addition, the display element may comprise further active, in particular opto-electronic components, preferably for remote transfer of the image. This allows to transmit the light beams output from the inverting reflection prism to an observer place at a distance therefrom. This may be advantageous in rather narrow protected spaces, for example, such as in a particularly protected vehicle, if the optical device according to the invention is to be used for external observation, but the transmitted image is then desired to be conveyed to a central location within the protected space. In a particularly preferred embodiment, the display element therefore comprises a high-resolution fiber-optic image guide which may be rigid or flexible as well.

In this way, it is possible in a particularly simple manner, regardless of the availability of electric power, to carry out an all-round observation outside and/or inside a specially protected space on a purely optical basis using the optical device according to the invention.

In particular when fiber-optic image guides are used, the distance between the location of image capture and the location of visualization is only limited by the available length of these fiber-optic image guides. Given a length of one to two meters of a fiber-optic image guide, the observer will therefore be able to carry out an all-round observation without stop at a distance of 1 m or more, or even 2 m or more from the location of image capture, which may be a great advantage from a safety point of view.

Such external observation may also involve a plurality of optical devices of this type, for example when used for a specially protected vehicle, which may be attached to the vehicle corners or towers, for example. In this case, it can be considered to combine the images from these optical devices at a central location for joint monitoring.

In this context, it is also conceivable to capture the image emerging from the inverting reflection prism via a camera for video transfer and to electronically transfer it to another location. If such active opto-electronic systems for remote transfer are located on the non-exposed side of the protective casing, the risk caused by external impacts or forces can be regarded as significantly lower, so that the use of such components on the protected side of a protective casing is considered to be rather uncritical. However, it has to be taken into account here that the opto-electronic systems require electric power, which can make emergency operation more difficult.

Further applications or optical elements may be provided in the beam path of the optical device, for example arranged between the proximal end of the image-guiding element and the display element. These may include lenses or lens systems, for example, such as a focusing lens between the light exit face of the image-guiding element and the inverting reflection prism, which is capable of focusing the light beams onto the entry face of the inverting reflection prism. Furthermore, at least one optical filter element may additionally be provided, for example. For use at night, ND filters or gray filters may be provided for example, in order to achieve uniform darkening in the image. An appropriate low-pass filter may be provided to avoid undesired optical effects such as a moiré pattern.

The rotational movement of the image-guiding element is preferably achieved purely mechanically, for example by means of a rotating mechanism. For this purpose, a positive and/or frictional traction mechanism drive or traction mechanism transmission may be provided, and the operator on the protected side can move a drive shaft, manually and mechanically, for example by means of a crank, and the torque thus generated is then accordingly transferred to the image-guiding element on the output side during operation. Advantageously, suitable tensioning means are provided for this purpose, which are preferably also arranged on the protected side. To counteract expansion slip, toothed belts may be used, for example.

Also, a cable or Bowden cable may be provided, also in combination with appropriate deflections. This enables an operator of the optical device to control, in a purely manual way, the viewing direction of the image-guiding element of the optical device, and this from a location spaced apart from the optical device. This location may advantageously be the same location at which the monitoring takes place, so that the operator itself can control the viewing direction.

The rotating mechanism preferably furthermore comprises a gear, preferably a gear assembly, which provides for a simultaneous rotation of the image-guiding element and the reflection prism. In this case, the proximal end of the image-guiding element may be firmly connected to a gear, for example, in particular a bevel gear, which may be meshed with a further gear, in particular a pinion. The inverting reflection prism may be firmly connected to a further gear, in particular a bevel gear, which may also be meshed with the pinion. The number of teeth of the two bevel gears is then preferably chosen so as to ensured that a Dove prism is rotated by half the angular value by which the proximal end of the image-guiding element is rotated.

In order to allow for flexible, versatile applications, the optical device should be as small as possible so that its installation requires little space. An embodiment comprising at least one fiber-optic image guide instead of mirrors or optical tunnel systems offers not only the advantage of smaller space requirement, but also a weight reduction. A low weight of the optical device also significantly increases the application options. The optical device therefore advantageously weighs less than 10 kg, preferably less than 8 kg, and most preferably less than 7 kg. Lightweight materials can be used for the surrounding housing for supporting purposes, for example aluminum materials or suitable plastics. With regard to the impacting forces, this is considered to be rather uncritical if the optical device or its essential components are mounted on the non-exposed side of the protective casing.

Another advantage is that the optical device has a modular configuration and/or is equipped with common adapters. For the image-guiding element this means that the distal end may comprise a standardized receptacle for connecting common objective lenses. This makes it possible to quickly replace the objective lens, for example as a consequence of a defect or else in order to be able to image a different field of view, for example by mounting an objective lens known as "fish-eye". For this purpose, a standardized threaded connection for camera lenses may be provided, for example corresponding to the C mount system so as to allow for mounting C mount lenses.

On the side of the eyepiece, a modular configuration means that exchange is made possible between an optical eyepiece and other optical or opto-electronic devices such as a camera.

Furthermore advantageously, at least the image-guiding element is connected to the optical device or to the protective casing in a detachable manner and can thus easily exchanged, since in most applications it will be arranged on the exposed, hazardous side and will therefore be at a higher risk of incurring damage and thus be subject to a higher probability of failure.

The optical device according to the invention can be used in various ways. A large field of application is a preferably purely optical and/or non-electric non-stop all-round observation of an outside area from a protected space or from an observation space.

Preferably, in this case, only the image-guiding element or even only the distal end of the image-guiding element is disposed outside, on the exposed side of the protective casing, so that the display element and/or the inverting reflection prism can be arranged inside the protected space, i.e. on the non-exposed side of the protective casing, and will be particularly protected in this way. The image can then be directed, by the image-guiding element, from the exterior into the interior through a small opening passing through the protective casing, to the reflection prism and the display element.

As a matter of course it is also possible to have only the display element arranged in the protected space, but in this case, the inverting reflection prism will at least partially be arranged on the exposed side and might therefore be in the hazardous zone. In this case, the image transfer into the interior of the protected space may be achieved through the display element, for example, provided the latter is also designed so as to have a small cross-sectional area as explained above.

In a particularly preferred embodiment, the space may be a protected space in a vehicle, for example, such as an armored vehicle, but it may also be a protected space in an aircraft or vessel, which may be designed to be manned, and the optical device can be used for observation of the exterior so as to protect the occupants during field use. The space may of course also be a stationary observation space. At least the display element can be disposed within the protected space in this case.

For image transfer into the interior of the protected space, a respective opening is provided in the protective casing, which preferably corresponds to the cross-sectional area of the component of the optical device intended for image transfer through the casing. The cross-sectional area required in the protective casing may preferably be less than 500 mm$^2$, more preferably less than 400 mm$^2$, yet more preferably less than 300 mm$^2$, most preferably less than 200 mm$^2$ or even less than 150 mm$^2$, in order to minimize the impairment of mechanical strength.

The image-guiding element may be implemented using flexible, high-resolution fiber-optic image guides, which may be routed to or into an unmanned tower that is arranged outside the protected space and is frequently used in modern, optionally remotely controlled or remotely controllable active or passive observation or operation stations. The movement of the distal end of the image-guiding element and thus the specific position of the light entry face or the field of view of the optical device may be combined with a targeting device, for example.

Therefore, the invention also allows for emergency operation, for example of unmanned remotely controlled or remotely controllable observation or operation stations, for example in the event of a failure of electrical systems.

Accordingly, in a further aspect the invention also encompasses an observation or operation station, in particular a stationary or movable observation or operation station which comprises an optical device according to the invention. The location of an operator of the observation or operation station and the optical observation or operation device may be spatially separated from one another in this case.

However, the image-guiding element may also comprise a curved rigid fiber-optic image guide, for example, or, in a further embodiment of the invention, a simple mirror component or a prism which can be used to deflect beams travelling perpendicular to the optical axis of the inverting reflection prism onto this optical axis. This allows for a very compact design of the image-guiding element.

Another large field of application, according to another aspect of the invention, is non-stop, preferably purely optical and/or non-electric all-round observation of the interior of a protected space from the outside, in which case at least the display element is disposed outside the protected space, and only the image-guiding element, preferably only the distal end of the image-guiding element is laid into the interior of the protected space.

In a particularly preferred embodiment, this may be a protected space in the industrial sector or the medical field or in the research environment, e.g. a magnetic field chamber, or a specially protected space in which the use of electrical or opto-electronic observation systems such as cameras is not possible, for example due to prevailing magnetic fields, spark risks or else because of excessive heat.

Thus, according to yet another aspect, the invention also provides an inspection device for observation of an interior, or in the context of machine vision, with a non-stop all-round sighting.

The all-round observation may thus be performed by an operator on the non-exposed side of the protective casing, and in this case an image of the field of view of the imaging optical element on the exposed side of the protective casing can be conveyed through an opening in the protective casing in the form of an ordered beam.

In summary, the advantages of the present invention are to allow for a transfer of images from the side of a rotating objective lens, where a section lying in the field of view is captured as an image, to the side of a stationary eyepiece, where the image is output, for example into the human eye or into a camera. When output directly into the human eye, a completely non-electric, purely optical image transfer is possible, which thus also allows for emergency operation, for example in the event of a failure of power supply.

At the same time, the optical device according to the invention allows to reduce the necessary size of the opening in the protective casing to the minimum cross-sectional area of the image-guiding element, which contributes to a significant minimization of the risk of weakening the casing and thus helps to reduce further risk factors in conjunction with different protected spaces.

Further details of the invention will be apparent from the description of the illustrated exemplary embodiments and the appended claims.

BRIEF DESCRIPTION OF THE DRAWINGS

FIG. 1 is an oblique view of an optical device according to a first embodiment;

FIG. 2 is a partially sectional side elevational view of the optical device of FIG. 1;

DETAILED DESCRIPTION

Figure 4:
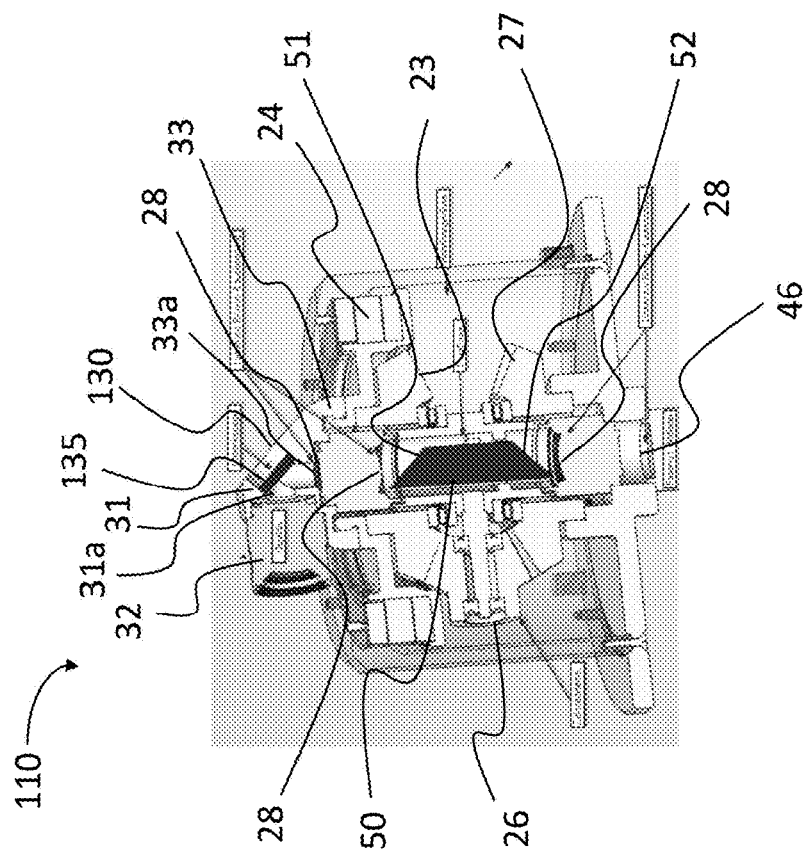
FIG. 4 is a partially sectional oblique view of the optical device of FIG. 3.

In the following detailed description of preferred embodiments, the same reference numerals designate substantially the same parts in or on these embodiments, for the sake of clarity. However, for a better illustration of the invention, the preferred embodiments shown in the figures are not always drawn to scale.

FIG. 1 shows an oblique view of an inventive optical device 10 according to a first embodiment of the invention. The illustrated optical device 10 comprises a housing 20 accommodating an inverting reflection prism, and an image-guiding element 30 having a distal end 31 and a proximal end 33. Display element 40 is curved, similar to the image-guiding element 30 without being restricted to the exemplary embodiment illustrated, and comprises an eyepiece 41 for an observer, which is illustrated only schematically.

FIG. 2 additionally shows the optical device 10 according to the invention in a partially sectional side elevational view. The partial sectional view relates to the housing 20. The partial sectional view shows an inverting reflection prism 50, in the example a Dove prism, which is arranged in the housing 20 such that light beams exiting from the image-guiding element 30 can pass through the reflection prism 50 along the longitudinal extension thereof, that is parallel to the optical axis thereof. To simplify assembly, a mounting flange 21 is provided which allows the optical device 10 to be connected firmly and releasably, for simple replacement, to a protective casing 11 which is only schematically illustrated in FIG. 1 for illustrative purposes.

Figure 3:
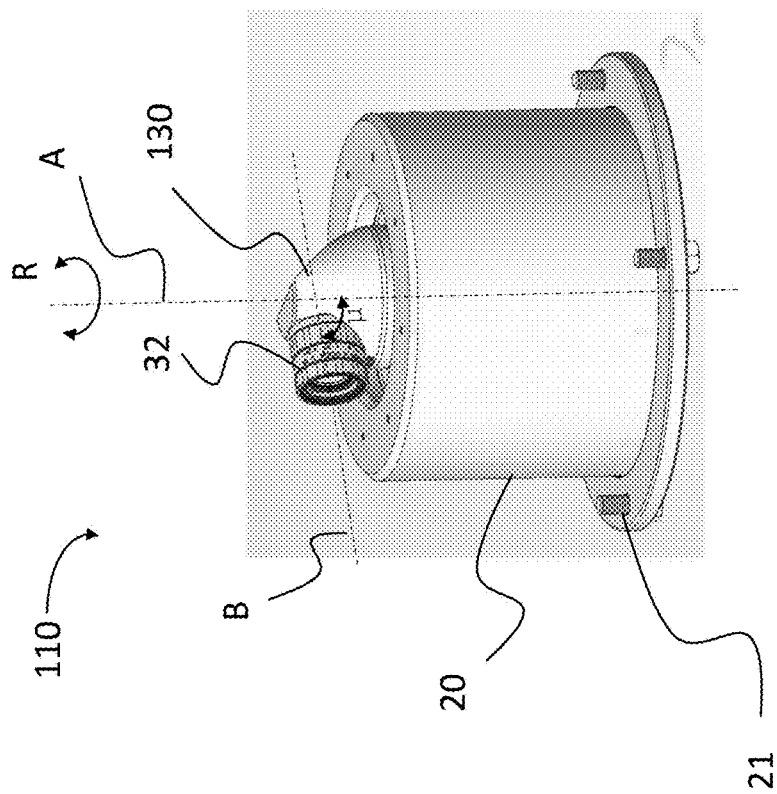
FIG. 3 is an oblique view of an optical device according to a second embodiment.

A likewise inventive optical device 110 according to a second embodiment is shown in FIG. 3 in an oblique view and in FIG. 4 in a partially sectional oblique view. In contrast to the curved configuration of the image-guiding element 30 of the optical device 10 shown in FIGS. 1 and 2, the image-guiding element 130 of optical device 110 is shown in a very compact, angled embodiment.

The embodiments of housing 20 with the mounting flange 21 as shown in FIGS. 1 through 4 are adapted for outside installation of the optical device 10, 110, that is to say for assembly to the outer surface, i.e. the exposed side 12 of the protective casing. As a result, the display element 40 is arranged on the protected side 13 of the protective casing 11 and is consequently protected by the protective casing 11. Of course, this is only one of several possible embodiments, in particular it is likewise envisaged to arrange essential components of the optical devices 10, 110 inside, that is on the non-exposed side 13 of the protective casing 11, in order to protect not just the display element 40, but also the housing 20 with the inverting reflection prism 50.

The distal end 31 of the image-guiding element 30 comprises a light entry face 31a which in the exemplary embodiment is coupled to an imaging optical element 32 for capturing the light beams of an object located in the field of view. In the example, an objective lens is provided for this purpose, which is coupled to the distal end 31 of the image-guiding element 30 via an adapter 34 that covers the light entry face 31a in the illustrated view.

In the exemplary embodiment, at least one further optical element 28 is provided in the beam path of the optical device 10 for outputting the light beams from the image-guiding element 30 and focusing them onto the entry face 51 of the inverting reflection prism 50. A further optical element 29 is provided for directing the light beams coming from the inverting reflection prism 50 onto the display element 40. This arrangement of the optical elements 28, 29 is shown highly schematically in the exemplary embodiment of FIG. 6.

In the exemplary embodiment of FIG. 2, the optical element 28 is in the form of a focusing lens. Light beams transmitted by the image-guiding element 30 are directed onto the inverting prism 50 and pass therethrough in a direction parallel to the optical axis. This means that the surface normal of light exit face 33a of the image-guiding element 30 and the optical axis of the Dove prism are parallel to one another. Reflection prism 50 has two faces 51, 52 which are inclined at the same angle with respect to a base and through which the light beams can enter and exit, respectively. When a beam of light is transmitted therethrough, the image is inverted.

In the case of an assembly as shown in FIG. 2, in operation, light beams propagating parallel to the base of the Dove prism are refracted twice, at the entry and exit faces 51, 52 of the Dove prism, which has a mirroring effect of a single reflection. After the light beams have passed through the inverting reflection prism 50 and have been reflected twice, the light beams are output via the exit face 52 of the Dove prism and are directed onto the display element 40.

The invention allows the image-guiding element 30 to be arranged and mounted so as to be rotatable without stop over more than 360° about an axis of rotation A parallel to the optical axis of the inverting reflection prism 50. This also causes the distal end 31 of image-guiding element 30 and hence the viewing field of the imaging optical element 32 to be rotated relative to the fixed display element 40.

Structurally, in the exemplary embodiment, the display element 40 is firmly mounted to the housing 20, while the Dove prism and the image-guiding element 30 are mounted for rotation about the axis of rotation A shown in broken lines in the example. The rotational movement during operation is indicated by "R" in FIG. 1. In the illustrated embodiment, the axis of rotation A of image-guiding element 30 coincides with the optical axis of the Dove prism, as can also be seen from FIG. 2, thus enabling a particularly simple and compact configuration. Accordingly, the optical axis of reflection prism 50 defines the axis of rotation A about which the image-guiding element 30 can be rotated during operation.

Rotation of the image-guiding element 30 relative to the fixed display element 40 about this axis of rotation A allows for the all-round observation or all-round monitoring over a range of more than 360° according to the invention.

The rotational movement of the image-guiding element 30 is achieved without electric power, that is to say purely mechanically, which is particularly advantageous in the event of a failure of electrical systems, for example as a result of a power failure. The non-stop all-round observation with a rotation of the image-guiding element 30 over more than 360° around the axis of rotation A thus allows, in a surprisingly easy way, for all-round monitoring of a space on the exposed side 12 of the protective casing 11 from a stationary display element 40 which is arranged on the opposite, protected side 13 of the casing 11.

The optical device 10, 110 according to the invention thus offers the great advantage of enabling to carry out an all-round observation outside or inside a specially protected space on a purely optical basis, independently of the availability of electric power.

In the exemplary embodiment shown in FIGS. 1 and 2, the image-guiding element 30 and the display element 40 are curved, each comprising a high-resolution fiber-optic image guide 35, 45.

At least one of the high-resolution fiber-optic image guides comprises a portion having a cross-sectional area of less than 500 mm$^2$, preferably less than 400 mm$^2$, and most preferably less than 300 mm$^2$. In a particularly preferred embodiment, this cross-sectional area is less than 200 mm$^2$ and even less than 150 mm$^2$ or less than 100 mm$^2$. In the exemplary embodiment, both high-resolution fiber-optic image guides 35, 45 have a consistent cross section along their length. In the illustrated exemplary embodiment, the high-resolution fiber-optic image guide 35, 45 has a cross-sectional area of only 100 mm$^2$. This allows an opening 14 to be introduced into the protective casing 11 to have a correspondingly small dimension. Such minimization of the required opening 14 means an enormous minimization of the loss of mechanical strength of the protective casing 11 caused by the opening 14.

The embodiment shown in FIGS. 1 and 2 offers great flexibility since both the image-guiding element 30 and the display element 40 comprise a high-resolution fiber-optic image guide of small cross section, so that the housing 20 may be arranged on both the exposed and the unexposed, protected side 13 of the protective casing 11. Image transfer through the protective casing 11 can be achieved using the image-guiding element 30 or else the display element 40. In both cases, only a very small opening 14 is required.

In the example, the high-resolution fiber-optic image guides 35, 45 each comprise optical fibers, the diameter of the individual optical fibers being 12 μm or less, preferably 10 μm or less, most preferably 7 μm or less. In the exemplary embodiment, the diameter of an individual optical fiber is 10 μm, and the image guide 35, 45 comprises a total of approximately 160,000 optical fibers. This makes it possible to provide a resolution in the range of approximately 45 lp/mm (line pairs/mm) for the optical device 10, 110. Such a high-resolution fiber-optic image guide is particularly well suited for the optical device and offers excellent sighting options, even in the long range of 500 m and more. In the exemplary embodiment, the high-resolution fiber-optic image guide is in the form of a flexible image guide.

The high-resolution fiber-optic image guide 35, 45 and preferably the optical device 10, 110 exhibit high temperature resistance in a range from at least −20° C. to 100° C., preferably from −40° C. to +125° C., and therefore comply with the MIL-STD-810H (2019) standard, so that they can be used within the scope of the standard.

In the exemplary embodiment, the high-resolution fiber-optic image guides 35, 45 each have a length of approximately 200 mm and thus also provide for a very compact design. However, other lengths are of course possible as well, with maximum dimensions based on the lengths available on the market. For example, applications are possible in which the high-resolution fiber-optic image guides 35, 45 have a length of more than 1 m, such as 2 m or even more, and may therefore be routed in a contour-following way, in particular in the case of a flexible high-resolution fiber-optic image guide.

This enables the image-guiding element 30 and/or the display element 40 to be laid very flexibly. For example, the illustrated embodiment with a flexible high-resolution fiber-optic image guide 35, 45 offers the advantage that the image-guiding element 30 can be adapted very well to the spatial conditions in terms of geometry. A flexible fiber-optic image guide 35, 45 may, for example, be routed through the protective casing into a tower and/or to a targeting system and can be rotated simultaneously with such targeting system during operation, in particular also over more than 360°.

A rigid design of the image-guiding element 30, on the other hand, offers the advantage that no complex additional support structures are required for the image-guiding element 30. In this way, the image-guiding element 30 can be made very small and compact and may also have a very low weight.

The embodiment of an optical device 110 according to the invention as shown in FIGS. 3 and 4 represents an embodiment of the invention that takes up this idea. Instead of a high-resolution fiber-optic image guide, a transfer system comprising a mirror 135 is proposed here for the image guiding element 130, as can be seen in FIG. 4.

Figure 6:
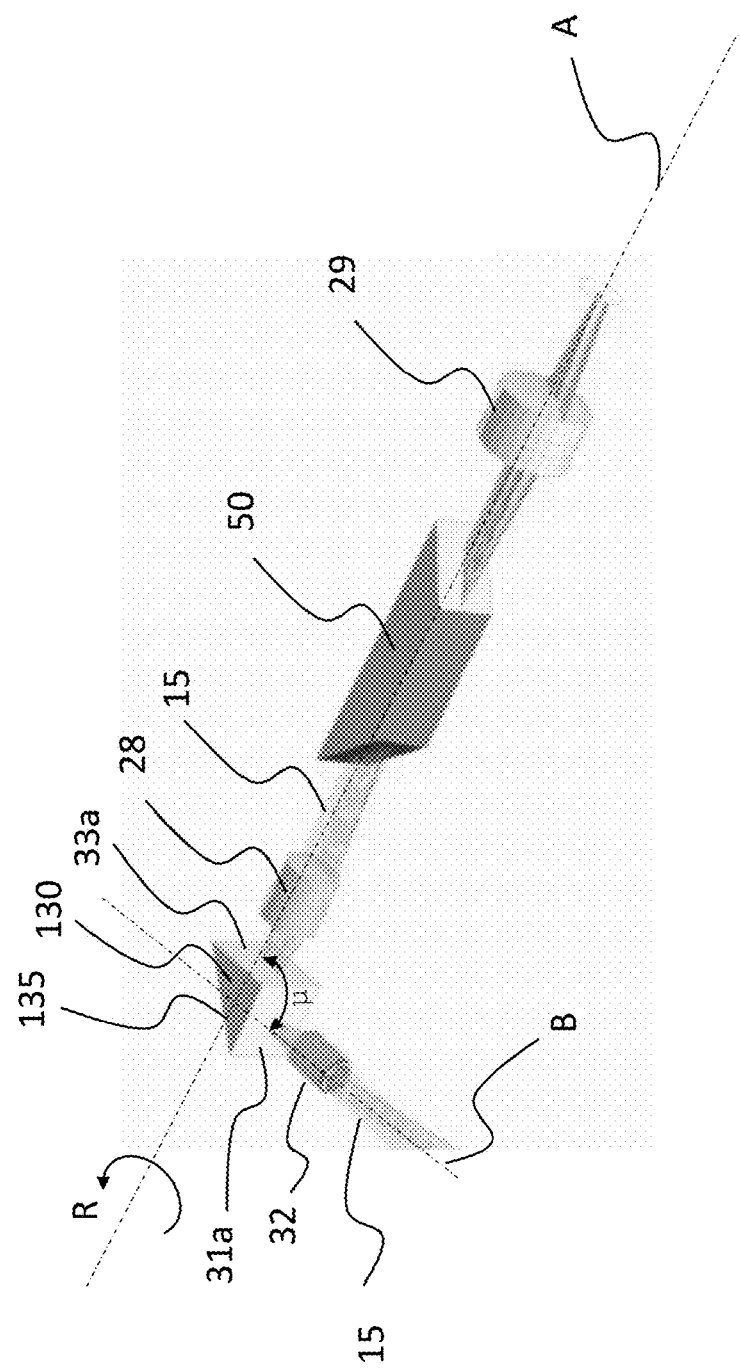
FIG. 6 shows the beam path in an optical device according to FIG. 3 or 4.

The beam path of this arrangement is additionally shown in FIG. 6. In this FIG. 6, the electromagnetic radiation that can be transmitted through the optical device 10, 110 is shown as a light beam 15. Also, for illustrative purposes, an optical element 28 is provided in the beam path, which is in the form of a focusing lens to focus the light beam onto the inverting reflection prism 50. For the sake of clarity, a display element has been omitted in this illustration.

In the illustrated arrangement, the image-guiding element 130 comprises a mirror 135 which, in operation, in the position shown, deflects light beams 15 travelling along the axis denoted "B" at a right angle to the optical axis. In operation, the mirror 135 rotates together with the image-guiding element 130 about the axis of rotation A, which is also the optical axis of the inverting reflection prism 50. The image-guiding element 130 comprises an imaging optical element 32.

It will be apparent to a person skilled in the art that the display element can be implemented as in the exemplary embodiment of FIGS. 1 and 2. The illustrated embodiment of the optical device 110 provides for a particularly compact, space-saving design of the image transmitting element 130.

The optical device 10, 110 according to the invention thus offers the great advantage of enabling operation in combination with a protective casing 11, in which case, during operation, an operator of the optical device 10, 110 on the safe, protected side 13 of the protective casing 11 is then able to perform an all-round observation of the opposite, exposed side 12 of the protective casing 11 using the display element 40, and the display element 40 enables continuous visualization of the surroundings lying in the field of view of the image-guiding element 30. In this way, the operator is protected by the protective casing 11 from possible hazards or impacting mechanical forces and is still able to observe the opposite space or area very comprehensively, although the casing 11 is otherwise opaque.

According to the invention, the image-guiding element 30, 130 may be curved or angled in order to allow the light beams to be deflected and in this way enable completely observation of the surrounding space with one rotation.

Accordingly, the surface normal of the light entry face 31a and the surface normal of the light exit face 33a of the image-guiding element 30, 130 are at an angle $\mu$ to one another. In the embodiment shown in FIG. 1, the surface normal of the light entry face 31a is parallel to the dash-dotted line denoted "B" which at the same time is the optical axis of the imaging optical element 32 of image-guiding element 30. The surface normal of the light exit face 33a of the image-guiding element 30 is parallel to the axis of rotation A which at the same time is the optical axis of the inverting reflection prism 50 in this embodiment.

In the embodiments of the optical device 10, 110 shown in the figures, the two surface normals are at a right angle to one another, so that the following applies: $\mu=90°$. In preferred embodiments, this angle is between 5° and 175°, preferably between 20° and 160°, and most preferably between 30° and 150°. An angle between 85° and 95° or of 90° is generally very suitable for non-stop all-round monitoring.

The field of view which can be imaged by the optical device 10, 110 is delimited vertically and/or horizontally by the light entry face 31a of the image-guiding element 30 or by the optical element 32. In a vertical direction, the field of view can be changed or set through the angle $\mu$. FIG. 1 illustrates the field of view 35 of the optical element 32 in its vertical extent, i.e. the vertical imaging angle of the optical element 32, merely by way of example.

In this way, the field of view that can be adapted in the vertical direction to different application situations, to different optical elements, or more generally to the optical properties, such as the numerical aperture NA, of the specific image-guiding element 30, for example.

In an advantageous embodiment of the invention, the angle $\mu$ is variably adjustable or selectively adjustable. In a most preferred embodiment of the invention, the angle $\mu$ can even be variably adjusted or selectively modified during a rotational movement, that is to say during operation of the optical device 10, 110, so that an operator of the optical device 10, 110 can change the field of view of the optical device 10, 110 in a vertical direction during operation. For this purpose, the image-guiding element 30 is preferably designed so as to be flexible in order to allow to change this angle $\mu$ using a purely mechanical pivoting means, for example.

The display element 40 may also be adapted to allow further deflection of the light beams, for example in combination with a high-resolution fiber-optic image guide. In this way it is possible, for example, that the viewing direction of the operator is parallel to the viewing direction of the image-guiding element, and that the optical device 10, 110 only provides a lateral offset.

For a compact design, the imaging element 30 of the embodiment shown in FIG. 1 has a small bending radius of approximately 30 mm in the present example. The embodiment shown in FIG. 3 can be made particularly compact. The part of the optical device 10, 110 arranged on the exposed side 12 of the protective casing 11 can be limited to a total height of less than 20 cm, for example overall heights of less than 15 cm or even less than 10 cm or even less are possible, which allows for versatile use. The overall height on the exposed side 12 can even be further reduced if the housing 20 is arranged on the non-exposed side 13 and only the image-guiding element 30, 130 or even only portions of the image-guiding element 30, 130 remain outside, on the exposed side 12. The remaining overall height is then essentially determined by the imaging optical element 32. This provides for a highly flexible, versatile use, and installation requires little space.

In this way, the optical device 10, 110 according to the invention allows particularly well to perform an all-round observation outside and/or inside a specially protected space on a purely optical basis, irrespectively of the availability of electric power.

The rotational movement of the image-guiding element 30 relative to the display element 40 is achieved in a purely mechanical way in this case.

A gear assembly for rotating the image-guiding element 30 relative to the inverting reflection prism 50 can be seen schematically in the sectional views of FIGS. 2 and 4. Here, the proximal end 33 of image-guiding element 30, 130 is firmly joined to a bevel gear 23 which is meshed with a further gear 26, in the example in the form of a pinion. The inverting reflection prism 50 is firmly joined to a further bevel gear 27 which is also meshed with the pinion. The number of teeth of the two gear wheels or bevel gears 23, 27 is chosen so as to ensured that the Dove prism is rotated by half the value of the angle of rotation by which the proximal end 33 of the image-guiding element 30, 130 is rotated. For this purpose, the inverting reflection prism 50 is also mounted in the housing 20 using a further bearing.

The rotational movement is achieved in a very simple way using a cable or Bowden cable. This enables an operator to control the viewing direction of the image-guiding element 30, 130 of the optical device 10, 110 purely manually, from a location spaced apart from the optical device 10, 110.

The optical device 10, 110 is kept very light weight and has a weight of less than 10 kg, preferably less than 8 kg, and most preferably less than 7 kg. The illustrated device 10, 110 has a weight between 2 and 7 kg.

The optical device 10, 110 has a modular configuration. For this purpose, the image-guiding element 30, 130 and the display element 40 are equipped with appropriate standardized connections, such as the mounting flange 21 or adapters 34, and are detachably connected to the housing, so as to enable quick exchange or replacement.

The optical device 10, 110 according to the invention can be used in a wide range of applications. A large field of application is the preferably purely optical and/or non-electric non-stop all-round observation of an outside area from a protected space.

Figure 5:
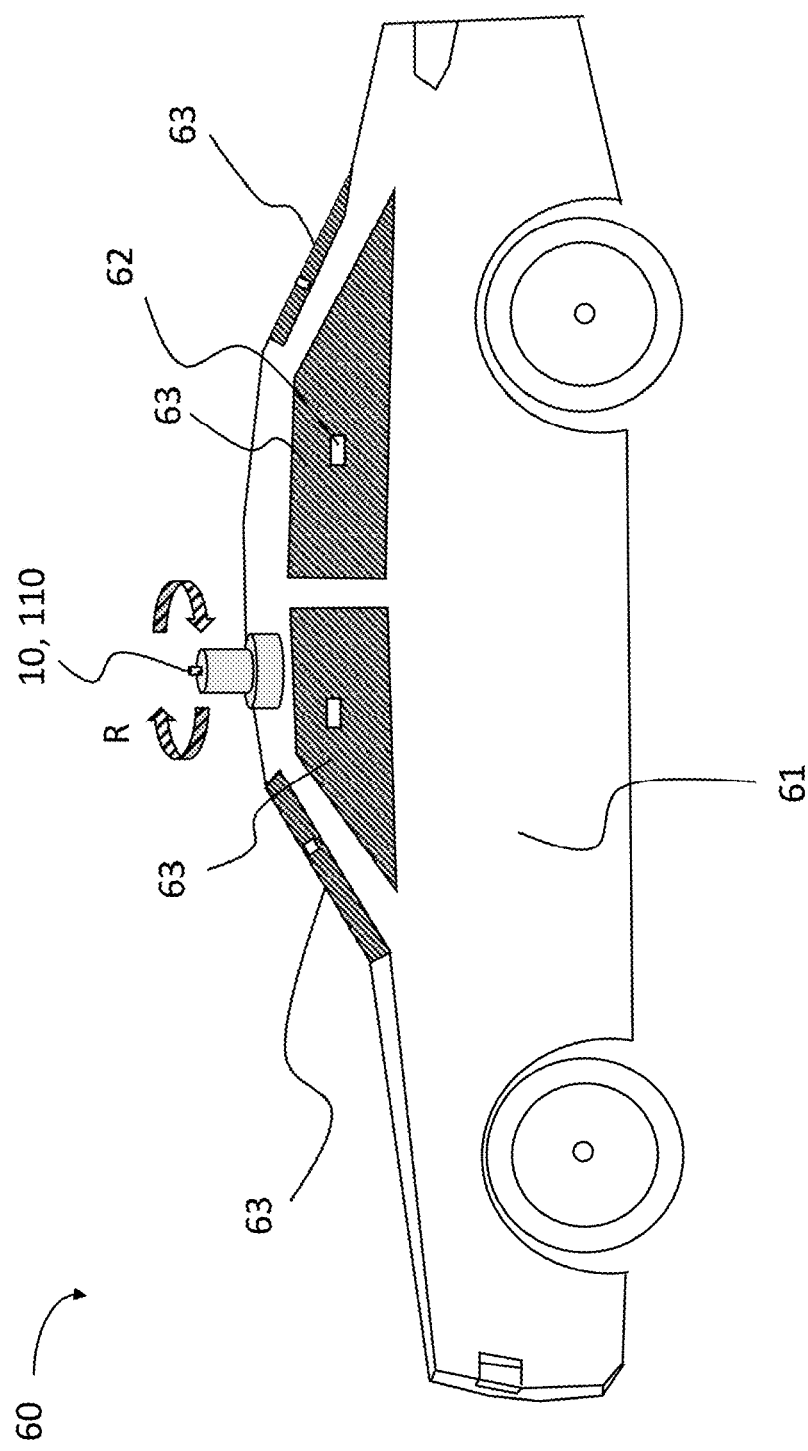
FIG. 5 is a side view of a particularly protected vehicle equipped with an optical device according to the invention.

In a particularly preferred embodiment, this is a protected space in a vehicle, for example an armored vehicle. FIG. 5 shows, merely by way of example, a particularly protected vehicle 60 in the exemplary form of an armored car having side armor 61 and being equipped with armored window covers 63 to protect the occupants. By virtue of their function, in order not to weaken the space to be protected or the window covers 63, a view outside is not possible or very limited, hardly allowing an all-round view, even if viewing slits 62 are provided in these window covers 63.

To ensure a certain all-round view, it would in fact be possible to provide a plurality of components, for example optical angle mirrors or periscopes, in particular arranged at the corners and/or other exposed locations, attachments or structures, for example in a tower or dome, in order to enable an observer inside the vehicle a view outside.

However, this type of all-round view is locally limited by the positional arrangement and by the type and reasonable size and number of elements, in particular on the observation side. Quite apart from the fact that such components are arranged at a spatial distance from one another, so that a virtually simultaneous or continuous observation cannot be done by possibly only one observer and/or cannot be achieved over 360° around the protected space without weakening the structure to be protected.

All-round viewing is therefore very limited. Moreover, angle mirrors are rather heavy and also require a lot of space, due to their large number. It is furthermore hardly possible for an individual operator to be able to completely or at least almost completely observe the exterior space surrounding the vehicle. Rather, several operators are required in order to be able to observe the front and rear of the vehicle 60, for example.

A major drawback of these systems can therefore be seen in the fact that an observer has to be in the immediate vicinity of an angle mirror in order to be able to carry out an external observation in the particular field of view. Also, a large number of angle mirrors are often required in order to be able to image the outer area to the largest possible extent. This results in the drawback mentioned before, that an observer who observes the rear area through a rear angle mirror will, for example, not have an overview of the angle mirrors in the front area of the vehicle 60, and therefore no overview of what is happening in front of the vehicle 60.

Instead of the many angle mirrors, the invention now allows to provide only a small number of, for example, four optical devices 10, 110 on the outer corners of the vehicle 60, or, as in the example of FIG. 5, a single optical device 10, 110 approximately in the center on the roof, and for observation of the exterior the images can be combined at a central location within the vehicle and can be visualized to the driver of the vehicle 60, for example. In this way, the invention enables a single operator to be able to cover and continuously monitor all areas, that is to say the front, lateral and/or rear areas of the surroundings of the vehicle 60.

The image-guiding element 30, 130 or the display element 40 can be used for image transfer through the protective casing 11, and therefore the opening 14 to be created in the protective casing can be kept very small, essentially corresponding to the cross-sectional area of the portion of the image-guiding element 30, 130 or display element 40 intended for this purpose.

The display element 40 and the operator are then also protected in the protected interior with this arrangement.

If flexible high-resolution fiber-optic image guides are used for the image-guiding element 30, they may also be routed to or into an unmanned tower which is arranged outside the protected space, so that they follow a movement of the tower. The orientation of the image-guiding element 30 and thus of the field of view of the optical device 10, 110 can be combined very advantageously with a targeting device. In this way, the invention also provides for emergency operation of unmanned remotely controlled or remotely controllable observation or operation stations, for example in the event of a failure of electrical systems.

Figure 7:
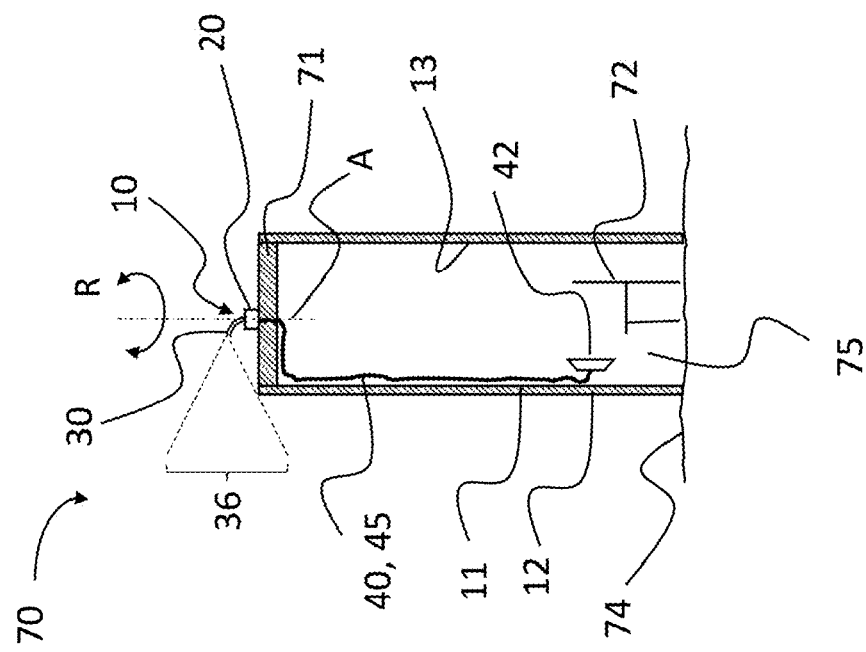
FIG. 7 is a side view of a stationary, remotely controlled or remotely controllable observation or operation station.

FIG. 7 schematically shows, purely by way of example and without limitation to the exemplary embodiment, a remotely controlled or remotely controllable operating station 70 which comprises a mounting platform 71 that is arranged a few meters above the ground 74 in the example and is supported thereon by a scaffold having side walls in the form of a protective casing 11. Provided inside the operation station 70 is a space 75 protected by the protective casing 11 and including an operator's place 72 allowing an operator to stay protected from external impacts.

In the illustrated embodiment, an optical device 10 is arranged on the mounting platform 71, and the housing 20 and the image-guiding element 30 are disposed above the mounting platform 71 and thus on the exposed side 12. The display element 40 comprises a high-resolution fiber-optic image guide 45 which allows to transmit images into the interior of the operation station 70 to the operator's place 72 which is a few meters away from the optical device 10, in the example between 3 and 5 m. For this purpose, the display element 40 additionally comprises a visualization device 42 which can be used by the operator to perform an all-round observation of the surroundings of the station. It is, of course, also possible to arrange an optical device 110 according to the embodiment shown in FIGS. 3 and 4 on the mounting platform 71.

Figure 8:
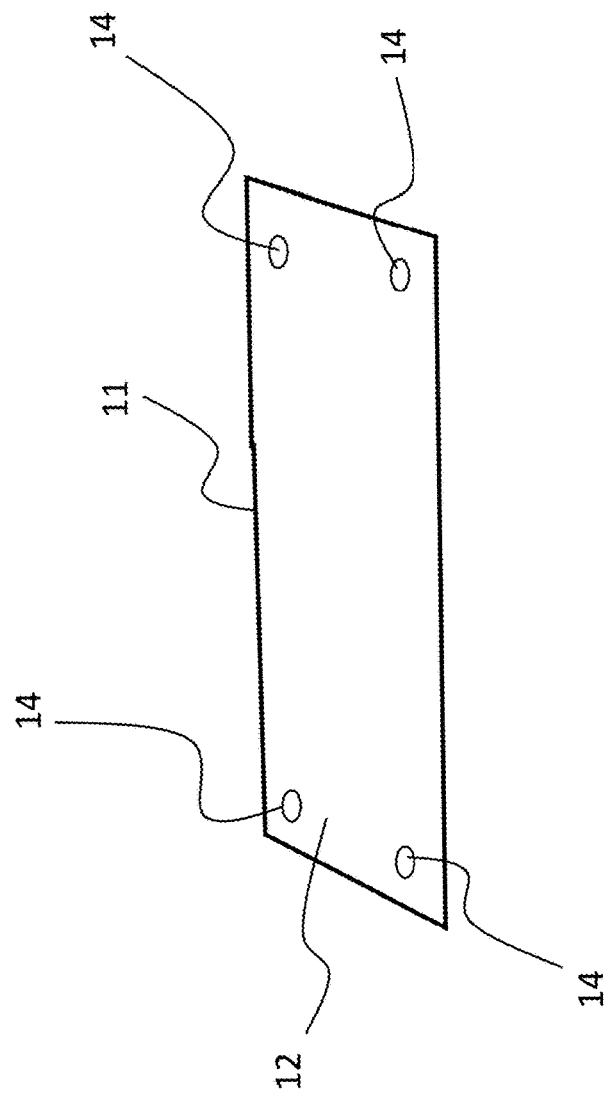
FIG. 8 is a top view of a portion of a protective casing with openings for receiving optical devices according to the invention.

FIG. 8 shows, purely schematically, a top view of a portion of a protective casing 11 by way of the example of a roof for a protected vehicle 60. The four corners of the roof are provided with respective circular openings 14 which allow to extend therethrough an image-guiding element 30, 130 or a display element 40 of an optical device 10, 110 according to the invention. A vehicle equipped with the optical device 10, 110 according to the invention in this way allows non-stop all-round observation of the surroundings of the vehicle.

Figure 9:
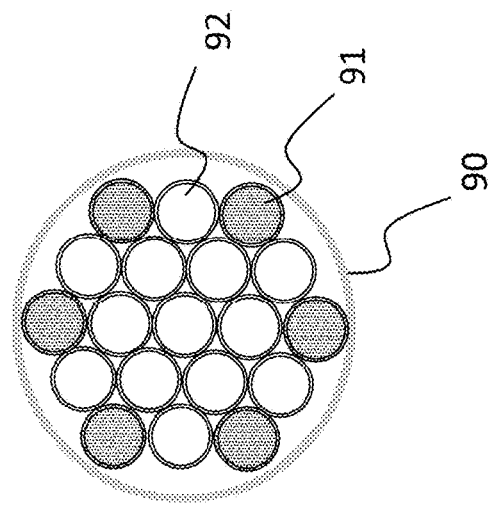
FIG. 9 is a cross-sectional view of a fiber-optic image guide.

FIG. 9 is a likewise purely schematic cross-sectional view showing a simply configured fiber-optic image guide comprising 19 individual optical fibers 92 in a regular arrangement in this example, to clarify the determination of the orientation of the image-guiding element. The illustrated fiber-optic image guide 90 comprises a total of six passive marking elements in the form of black colored optical fibers 91 which are arranged at regular intervals from one another on the outer edge of the fiber bundle. In operation, the distance between adjacent marking elements can then be used as an increment for determining the orientation, that is to say the specific angle of rotation by which the proximal end is rotated relative to a zero position.

Figure 10:
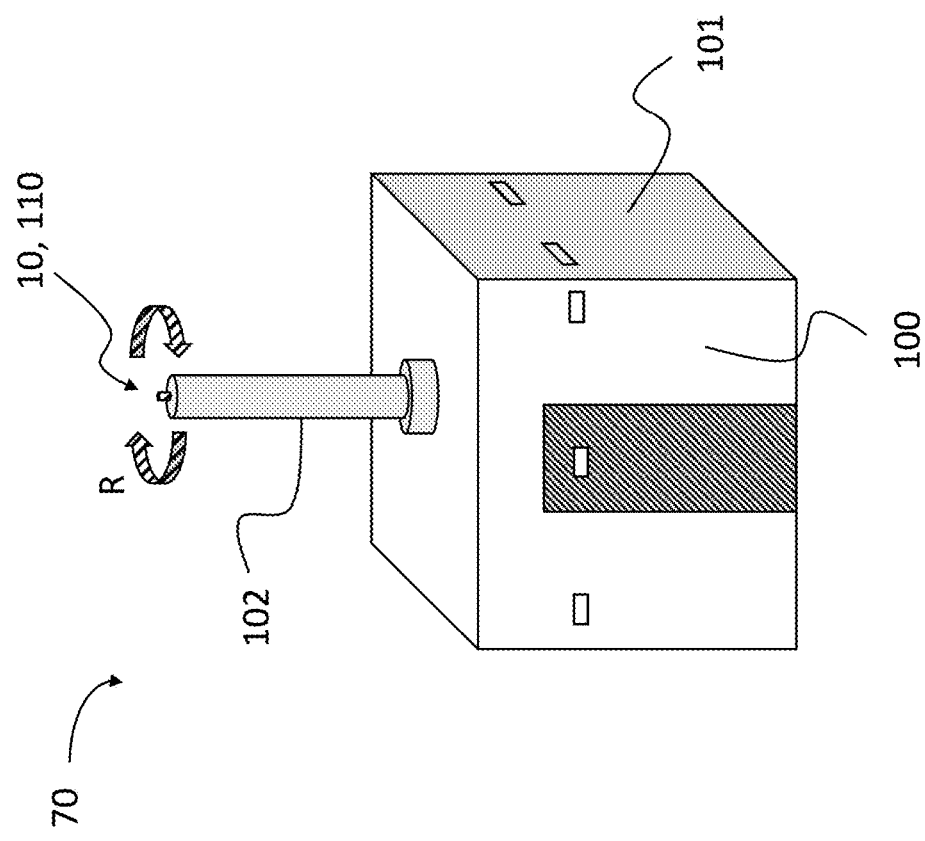
FIG. 10 shows a further view of a stationary, remotely controlled or remotely controllable observation or operation station.

Finally, FIG. 10 schematically shows a further exemplary embodiment according to the invention
of a remotely controlled or remotely controllable operating station 70, configured on the basis of the exemplary embodiment shown in FIG. 7 and constituting a refinement thereof. In this exemplary embodiment, an operator is accommodated in a protected building 100 which has protected, in particular armored side walls 111. On the roof, a pole 102 is provided which may have a height of a few meters, e.g. 1 m or else 2 m, 3 m, 4 m, 5 m, or even more, and which comprises an optical device 10, 110 at its upper end, which enables non-stop all-round observation. The greater height which is achievable provides for an excellent all-round view, both in the immediate vicinity in the immediate surroundings of the building 100 and in the distant area, in particular in conjunction with a variable angle μ.

Another large field of application is the non-stop, preferably purely optical and/or non-electric all-round observation of the interior of a protected space from the outside, in which case at least the display element 40 is arranged outside the protected space in order to provide adequate protection to the operator.

LIST OF REFERENCE NUMERALS

| 10 | Optical device |
| 11 | Protective casing |
| 12 | Exposed side |
| 13 | Protected side |
| 14 | Opening |
| 15 | Light beams |
| 20 | Housing |
| 21 | Mounting flange |
| 23 | Bevel gear |
| 26 | Gear |
| 27 | Bevel gear |
| 28 | Optical element |
| 29 | Optical element |
| 30 | Image-guiding element |
| 31 | Distal end |
| 31a | Light entry face |
| 32 | Imaging optical element |
| 33 | Proximal end |
| 33a | Light exit face |
| 34 | Adapter |
| 35 | High-resolution fiber-optic image guide |
| 36 | Field of view |
| 40 | Display element |
| 41 | Eyepiece |
| 42 | Visualization device |
| 45 | High-resolution fiber-optic image guide |
| 50 | Reflection prism |
| 51 | Entry face |
| 52 | Exit face |
| 60 | Vehicle |
| 61 | Side armor |
| 62 | Viewing slot |
| 63 | Window cover |
| 70 | Operation station |
| 71 | Mounting platform |
| 72 | Operator's place |
| 73 | Display element |
| 74 | Ground |
| 75 | Protected space |
| 100 | Building |
| 102 | Pole |
| 111 | Side wall |
| 110 | Optical device |
| 130 | Image-guiding element |
| 135 | Mirror |
| A | Axis of rotation |
| B | Axis of rotation |
| R | Rotational movement |

What is claimed is:

1. An optical device for high-resolution image transfer from an environment, comprising:
   an image-guiding element having a light entry face and a light exit face, the light entry face captures light beams from the environment, the light exit face emits and directs the light beams captured by the light entry face;
   an angle defined between a surface normal to the light entry face and a surface normal to the light exit face is between 5° and 175°;
   an inverting reflection prism having an optical axis, an entry face, and an exit face, the entry face being positioned to capture the light beams emitted and directed from the light entry face of the image-guiding element;
   a display element, the exit face of the inverting prism emits and directs the light beams captured by the entry face onto the display; and
   a mounting that provides non-stop rotation of the image-guiding element relative to the inverting reflection prism and of the image-guiding element relative to the display element, over more than 360° about an axis of rotation that is parallel to the optical axis,
   wherein the rotational movement of the image-guiding element relative to the display element is achieved without electric power.

2. The optical device of claim 1, wherein the angle is between 20° and 160°.

3. The optical device of claim 1, wherein the angle is between 85° and 95°.

4. The optical device of claim 1, wherein the angle is variably adjustable or selectively adjustable during rotation of the image-guiding element.

5. The optical device of claim 1, wherein the image-guiding element is curved and/or angled.

6. The optical device of claim 1, wherein the image-guiding element and/or the display element have at least a section that is rigid or flexible.

7. The optical device of claim 1, wherein the image-guiding element and/or the display element comprises a fiber-optic image guide.

8. The optical device of claim 7, wherein the fiber-optic image guide comprises at least 10,000 optical fibers having a diameter of 12 µm or less.

9. The optical device of claim 7, wherein the fiber-optic image guide is flexible or rigid at least in sections thereof.

10. The optical device of claim 7, wherein the fiber-optic image guide exclusively or additionally comprises IR fibers configured to transmit electromagnetic radiation in a spectrum selected from a group consisting of: a near infrared range between 780 nm and 940 nm; a range up to 3,000 nm; an infrared range above 3,000 nm; and any combinations thereof.

11. The optical device of claim 1, wherein the image-guiding element comprises at least one marked or markable optical fiber.

12. The optical device of claim 1, wherein the image-guiding element and/or the display element exhibit maximum attenuation in a visible wavelength range of electromagnetic radiation from 380 nm to 780 nm of not more than 5 db/m.

13. The optical device of claim 1, wherein the mounting is configured so that the inverting reflection prism rotates at an angular velocity that is double an angular velocity of the image-guiding element.

14. The optical device of claim 1, further comprising a resolution of the light beams at the display that is at least 25 lp/mm.

15. The optical device of claim 1, wherein the image-guiding element and/or the display element comprises a region with a cross-sectional area of less than 500 mm².

16. The optical device of claim 1, wherein the display element is selected from a group consisting of an eyepiece, an optical image device, a thermal image device, and an active opto-electronic image transfer device.

17. The optical device of claim 1, further comprising a second optical element arranged in a beam path of the light beams, the second optical element comprising a focusing element and/or an optical filter element.

18. The optical device of claim 1, wherein the mounting comprises a mechanical rotating mechanism comprising a gear assembly and/or a traction mechanism.

19. The optical device of claim 1, wherein the display displays the light beams in a purely optical and/or non-electric manner.

20. A vehicle or observation station, comprising:
 a surrounding protective casing defining a protected interior and an exterior; and
 the optical device according to claim 1 positioned so that the light entry face of the image-guiding element is in the exterior and the display element is the protected interior.

21. The optical device of claim 1, wherein the rotational movement of the image-guiding element relative to the display element is purely mechanical.

22. An optical device for high-resolution image transfer from an environment, comprising:
 an image-guiding element having a light entry face and a light exit face, the light entry face captures light beams from the environment, the light exit face emits and directs the light beams captured by the light entry face;
 an angle defined between a surface normal to the light entry face and a surface normal to the light exit face is between 5° and 175°;
 an inverting reflection prism having an optical axis, an entry face, and an exit face, the entry face being positioned to capture the light beams emitted and directed from the light entry face of the image-guiding element;
 a display element, the exit face of the inverting prism emits and directs the light beams captured by the entry face onto the display; and
 a mounting that provides non-stop rotation of the image-guiding element relative to the inverting reflection prism and/or of the image-guiding element relative to the display element, over more than 360° about an axis of rotation that is parallel to the optical axis, wherein the image-guiding element and/or the display element comprises a fiber-optic image guide having at least 10,000 optical fibers each with a diameter of 12 µm or less.

23. An optical device for high-resolution image transfer from an environment, comprising:
 a first image-guiding element having a first light entry face and a first light exit face;
 a second image-guiding element having a second light entry face and a second light exit face;
 an inverting reflection prism having an optical axis, a prism entry face, and a prism exit face, the prism being operatively positioned between the first and second image-guiding elements such that the prism entry face captures light beams emitted from the first light exit face and such that the prism exit face emits the light beams onto the second light entry face; and
 a mounting configured to rotate the prism over more than 360° about an axis of rotation that is parallel to the optical axis such that the prism entry face rotates relative to the first light exit face and such that the prism exit face rotates relative to the second light entry face.

24. The optical device of claim 23, wherein the mounting is further configured to rotate the first and/or second image guides about the axis of rotation relative to the prism.

25. The optical device of claim 24, wherein the mounting rotates the prism at a first angular velocity and rotates the first and/or second image guides at a second angular velocity, wherein the first angular velocity is half the second angular velocity.

* * * * *